(12) United States Patent
Donelson (10) Patent No.: US 11,060,248 B2
(45) Date of Patent: Jul. 13, 2021

(54) ACTUATING RESURFACING SYSTEM AND METHOD

(71) Applicant: Donelson Construction Co., LLC, Clever, MO (US)

(72) Inventor: Michael James Donelson, Springfield, MO (US)

(73) Assignee: DONELSON CONSTRUCTION CO., LLC, Clever, MO (US)

( * ) Notice: Subject to any disclaimer, the term of this patent is extended or adjusted under 35 U.S.C. 154(b) by 168 days.

(21) Appl. No.: 16/211,599

(22) Filed: Dec. 6, 2018

(65) Prior Publication Data
US 2020/0181857 A1 Jun. 11, 2020

(51) Int. Cl.
| | | |
|---|---|---|
| E01C 19/48 | (2006.01) | |
| E01C 11/00 | (2006.01) | |
| E01C 7/14 | (2006.01) | |
| E01C 7/18 | (2006.01) | |

(52) U.S. Cl.
CPC ........... *E01C 19/48* (2013.01); *E01C 11/005* (2013.01); *E01C 7/147* (2013.01); *E01C 7/187* (2013.01)

(58) Field of Classification Search
CPC ........ E01C 19/48; E01C 11/005; E01C 7/147; E01C 7/187
See application file for complete search history.

(56) References Cited

U.S. PATENT DOCUMENTS

| | | | | |
|---|---|---|---|---|
| 1,802,087 A | * | 4/1931 | McConnaughay | ........................ E01C 19/1054 404/92 |
| 2,426,702 A | * | 9/1947 | Millikin | .................. E01C 19/42 404/119 |
| 2,426,703 A | * | 9/1947 | Millikin | .................. E01C 19/42 404/119 |
| 3,541,934 A | * | 11/1970 | Hughes | ................. E01C 19/185 404/120 |
| 3,638,539 A | * | 2/1972 | Lewis | ..................... E02F 3/786 404/84.2 |
| 3,749,504 A | | 7/1973 | Smith | |
| 3,880,542 A | | 4/1975 | Mullen | |
| 4,268,187 A | * | 5/1981 | Krause | .................... E01C 7/187 404/118 |
| 4,477,203 A | | 10/1984 | Laditka | |
| 4,767,234 A | * | 8/1988 | Rizzo | ..................... E01C 19/16 118/108 |
| 4,898,247 A | * | 2/1990 | Springfield | ........... E02F 3/7668 172/200 |
| 4,917,533 A | * | 4/1990 | Wilson | .................. E01C 11/005 118/108 |
| 6,582,152 B2 | | 6/2003 | Leone et al. | |
| 6,715,957 B2 | | 4/2004 | Colvard et al. | |
| 8,025,458 B2 | * | 9/2011 | Musil | ..................... E01C 19/48 404/86 |

(Continued)

*Primary Examiner* — Abigail A Risic
(74) *Attorney, Agent, or Firm* — Armstrong Teasdale LLP (57) ABSTRACT

A system for re-surfacing a pavement surface includes a mobile vehicle having a first longitudinal axis and a material delivery mechanism having a second longitudinal axis. The system also includes an actuation system coupled to the mobile vehicle and to the material delivery mechanism. The actuation system is configured to actuate the material delivery mechanism with respect to the mobile vehicle such that the first longitudinal axis is oriented obliquely with respect to the second longitudinal axis.

33 Claims, 5 Drawing Sheets

(56) References Cited

U.S. PATENT DOCUMENTS

| | | | | |
|---|---|---|---|---|
| 8,591,144 B1* | 11/2013 | Bean | ............ | E01C 19/48 404/101 |
| 2004/0208699 A1* | 10/2004 | Grubba | ............ | E01C 19/46 404/84.1 |
| 2005/0058507 A1* | 3/2005 | Musil | ............ | E01C 19/48 404/108 |
| 2015/0132058 A1 | 5/2015 | Anderson et al. | | |
| 2016/0082828 A1* | 3/2016 | Wen | ............ | B60K 7/0015 180/308 |

* cited by examiner

ACTUATING RESURFACING SYSTEM AND METHOD

BACKGROUND OF THE DISCLOSURE

The field of the disclosure relates generally to pavement re-surfacing and, more particularly, to a method and systems for re-surfacing a pavement surface using an actuating material delivery mechanism.

At least some known resurfacing systems include a mobile vehicle, such as a truck, that holds a supply of at least one material to be applied to a road surface. Additionally, at least some known resurfacing systems include a material delivery device that is attached to the mobile vehicle. For example, the material delivery device may be dragged behind the vehicle or suspended from the vehicle for delivering and/or dispersing material to the road surface behind the mobile vehicle. In at least some known resurfacing systems, the material delivery device is fixedly coupled to the mobile vehicle such that the longitudinal axes of the mobile vehicle and the material delivery device are aligned. For relatively straight sections of road surface, this configuration is acceptable.

However, when such a configuration is used to resurface a portion of a curved road surface, such as a cul-de-sac, the fixed alignment of the mobile vehicle and the material delivery device prevents the outer end of at least some material delivery devices from reaching to the edge of the road surface to be resurfaced. As a result, at least some known resurfacing systems require a crew to work the material to the edge of road surface, which increases the overall time and costs required to compete the resurfacing.

BRIEF DESCRIPTION

In one aspect, a system for re-surfacing a pavement surface is provided. The system includes a mobile vehicle having a first longitudinal axis and a material delivery mechanism having a second longitudinal axis. The system also includes an actuation system coupled to the mobile vehicle and to the material delivery mechanism. The actuation system is configured to actuate the material delivery mechanism with respect to the mobile vehicle such that the first longitudinal axis is oriented obliquely with respect to the second longitudinal axis.

In another aspect, a method for re-surfacing a pavement surface using a pavement resurfacing system is provided. The method includes coupling a material delivery mechanism to a mobile vehicle, wherein the mobile vehicle includes a first longitudinal axis and the material delivery mechanism includes a second longitudinal axis. The method also includes coupling an actuation system to the mobile vehicle and to the material delivery mechanism and operating the actuation system to move the material delivery mechanism with respect to the mobile vehicle such that the first longitudinal axis is oriented obliquely with respect to the second longitudinal axis.

DETAILED DESCRIPTION

As used herein, the term "slurry" describes a cold (ambient or low temperature) aggregate and bitumen blend. Such a slurry is conventionally compounded with water for effective mixing and may contain a catalyst or retarder to affect the composition's cure time, or other catalyst to aid in curing along with other additives.

Furthermore, the term "seal coat" describes a chip seal or a slurry using a fine aggregate.

Additionally, the term "microsurfacing" describes a chemically driven, typically quicker curing slurry composition.

Similarly, the term "emulsion oil" describes emulsified bitumen (asphalt), which is a combination of water, bitumen, and an emulsifier that allows homogenous compounding of the water and bitumen.

Moreover, the term "rejuvenator/rejuvenating material/rejuvenating oil" describes the lighter oil fraction of asphalt bitumen. This lighter fraction is usually the first to be lost when exposed to the elements (i.e. sunlight, water, and oxygen). It is found advantageous to apply this material to the road surface by itself or in compound with straight (emulsified) bitumen, or other slurry type materials to replenish those lost light oils.

As used herein, the term "hot mix asphalt or asphaltic concrete" describes a hot aggregate and bitumen blend. This includes "warm mix" asphalt compositions. Similarly, the term "cold mix asphalt" describes a low or ambient temperature aggregate blended with bitumen. Typically, slurry seal and micro-surfacing fall into this category.

Finally, the term "chip seal surface" describes bitumen sprayed or otherwise applied onto a road surface and covered by aggregate to create a new wearing/driving surface.

As used herein, the term "delivery mechanism" describes any biased or unbiased device(s) or structure(s), or combination thereof that is the vehicle or pathway for a spreadable material to be transferred, or "delivered" from a source tank or mixing chamber to a pavement surface. The delivery mechanism(s) may be fully or partially enclosed to allow controllable flow of the spreadable material to the pavement surface. For instance, spreadable material that is applied onto a pavement surface, and spread across that surface with an auger or similar transfer device, may be applied uniformly or not uniformly, depending upon desired results.

Furthermore, as used herein, the term "dispersing/dispersal mechanism/device/bar" describes any biased or unbiased device(s) or structure(s), or combination thereof that facilitates spreading the spreadable material into cracks formed in the pavement surface and/or into a generally uniform layer of material on the pavement surface.

Figure 1:
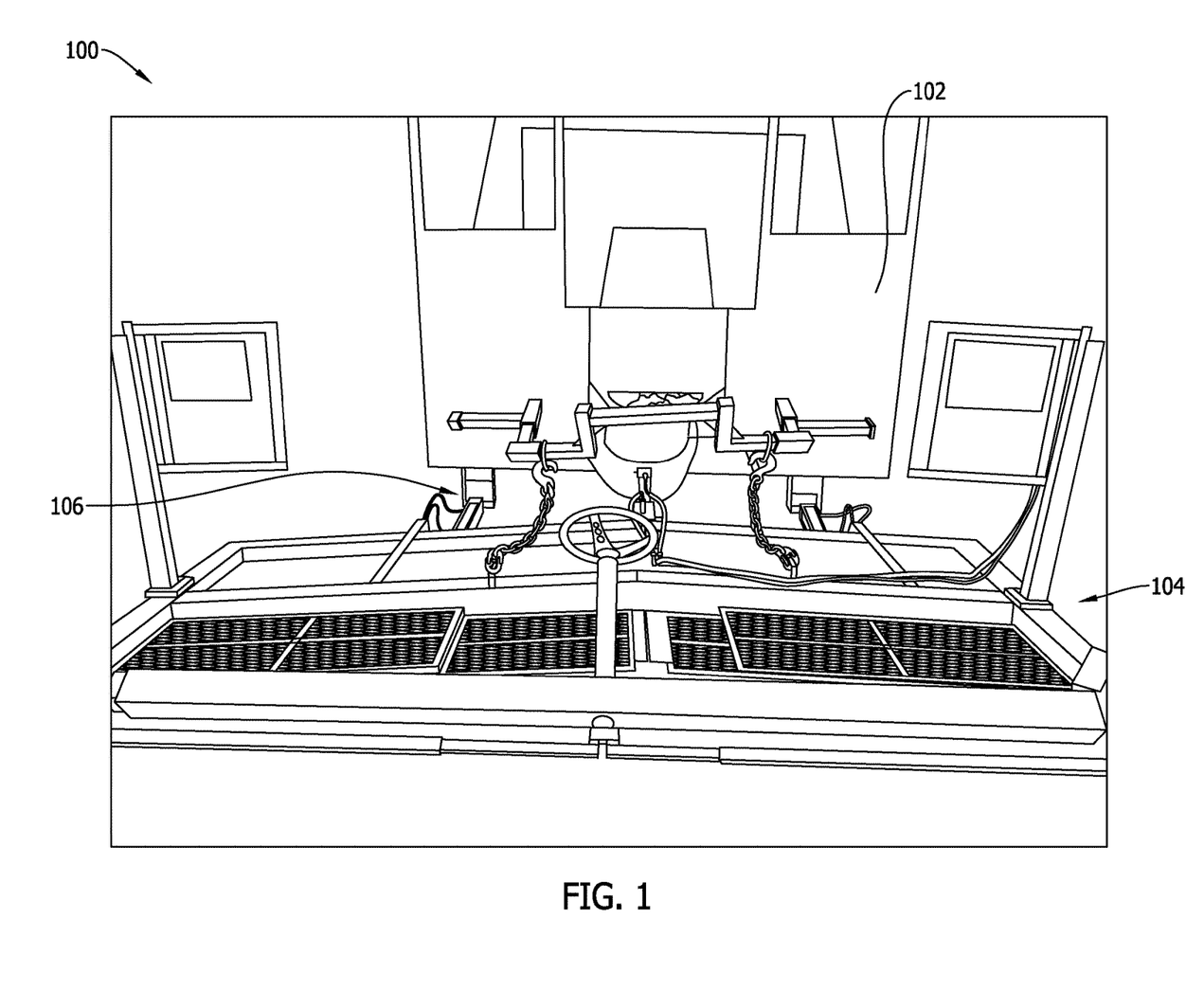
FIG. 1 is a rear view of an exemplary pavement resurfacing system illustrating a mobile vehicle, a material delivery mechanism, and an actuation system.
Figure 2:
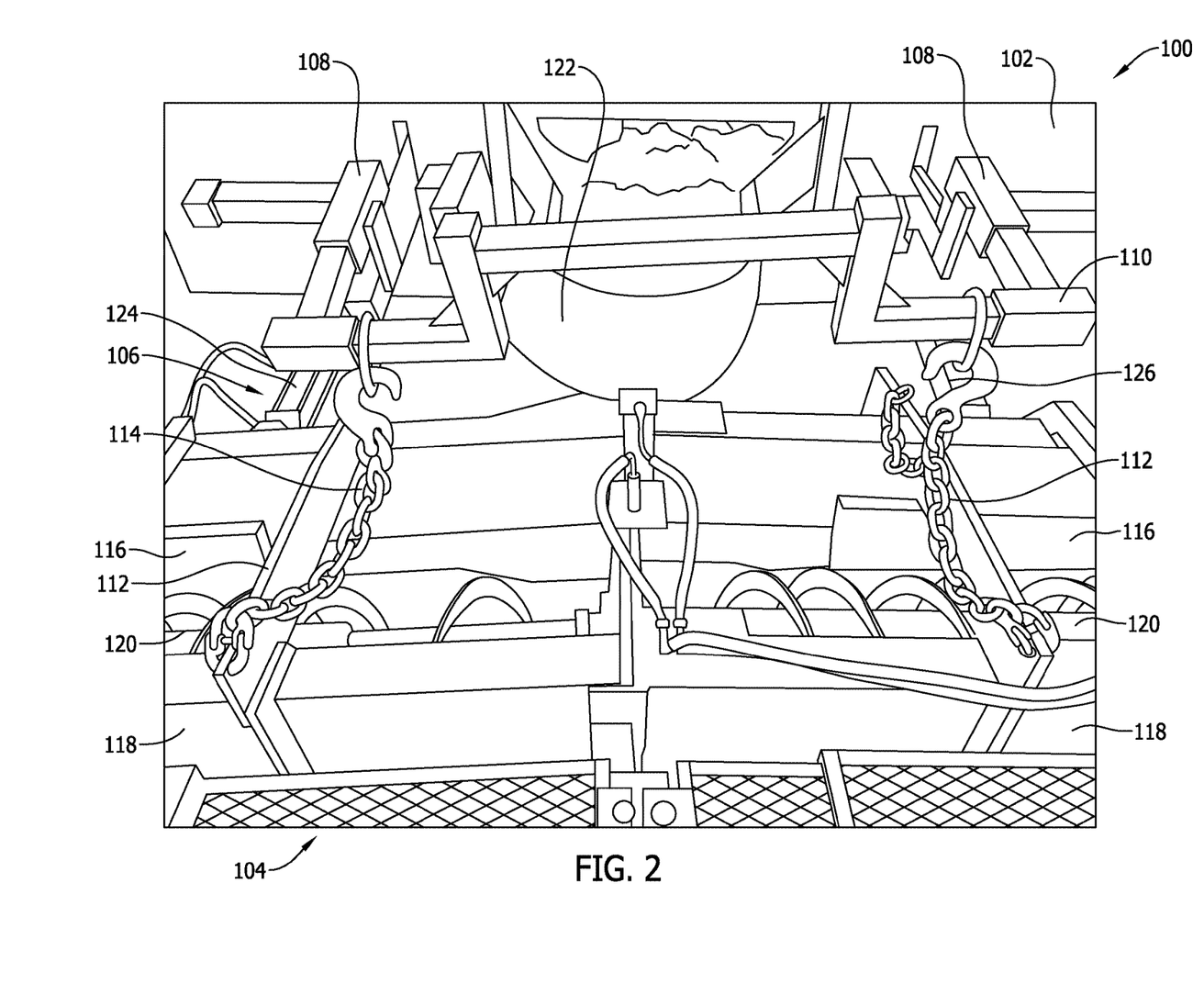
FIG. 2 is an enlarged view of a portion of the pavement resurfacing system shown in FIG. 1.
Figure 3:
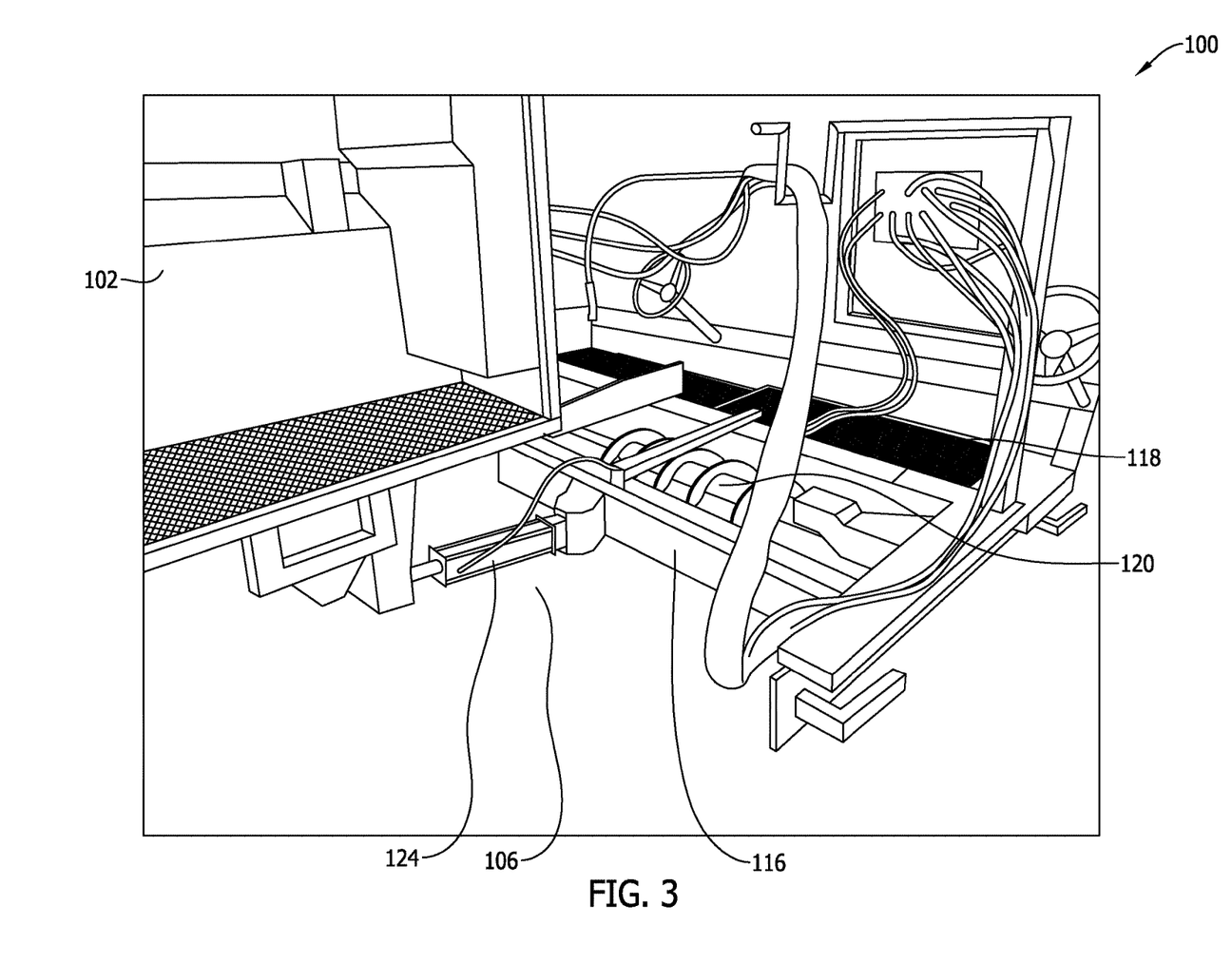
FIG. 3 is a perspective side view of a portion of the pavement resurfacing system shown in FIG. 1.
Figure 4:
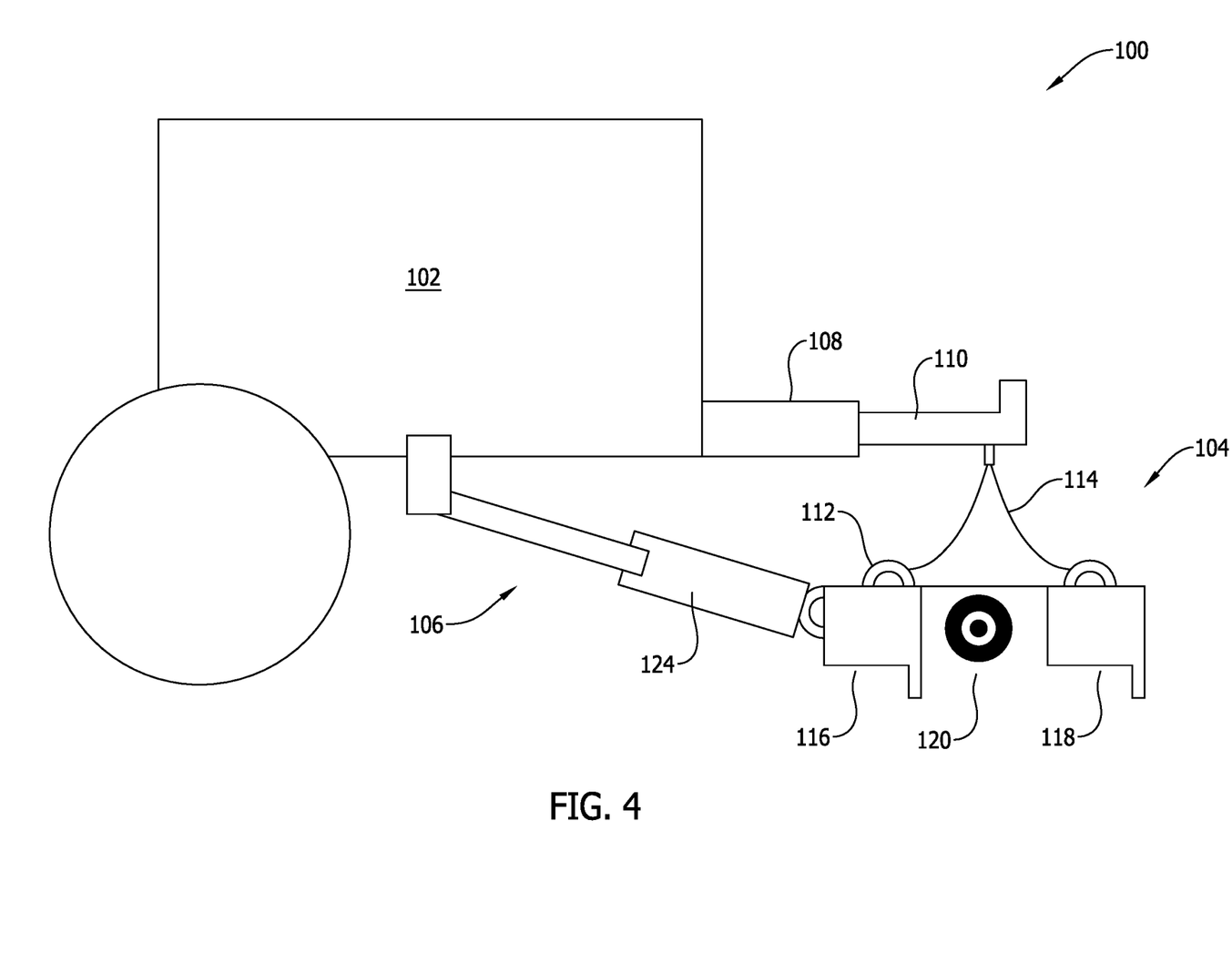
FIG. 4 is a partial cross-sectional side view of the pavement resurfacing system shown in FIG. 1.

FIG. 1 is a rear view of an exemplary pavement resurfacing system 100 illustrating a mobile vehicle 102, a material delivery mechanism 104, and an actuation system 106. FIG. 2 is an enlarged view of a portion of the pavement resurfacing system 100. FIG. 3 is a perspective side view of a portion of the pavement resurfacing system 100. FIG. 4 is a partial cross-sectional side view of the pavement resurfacing system 100.

System 100 may be implemented using any mobile vehicle configurable for re-surfacing applications. For example, the mobile vehicle may be a truck equipped with material storage facilities, pumps, plumbing, towing means, and other equipment which allow the mobile vehicle to store, transport, disperse, and distribute material to micro-surface a pavement surface. During operation, material is applied as the mobile vehicle moves across the pavement surface thereby re-surfacing the pavement surface.

To re-surface a pavement surface 208, a slurry material is stored in mobile vehicle 102, e.g., in bulk tank storage of the mobile vehicle. Slurry material includes emulsified oil and aggregate, such as but not limited to a chip seal or asphaltic concrete (hot mix asphalt). Slurry material may further include one or more of emulsified asphalt, water, catalysts (e.g., Portland cement), chemicals to slow system break, fiber material, and other materials. In one embodiment, slurry material is a micro-surfacing material used to micro-surface a roadway. In another embodiment, slurry material is a seal coat. In yet another embodiment, slurry material is an emulsion oil and is used to facilitate a crack sealing process. Slurry material may be pre-mixed off site, compounded on the mobile vehicle, or a combination of both.

At least some of slurry material may be mixed with additives 206 to improve ductility, adhesion, crack sealing, toughness, or other similar properties. Mixing may be accomplished using any standard means, e.g., using line injection. The resulting mixture may be distributed on the paved surface using material delivery mechanism 104.

Figure 5:
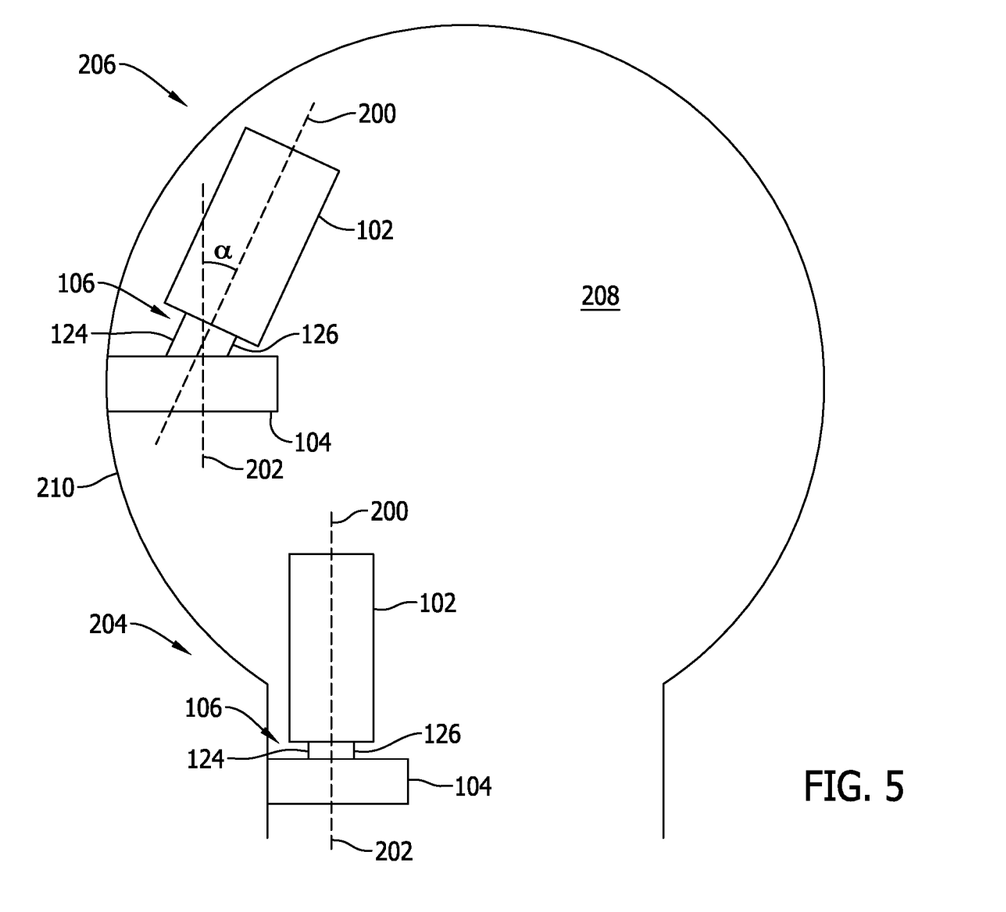
FIG. 5 is a schematic diagram of the pavement resurfacing system shown in FIG. 1 in a first position and in a subsequent second position.

In the exemplary embodiment, pavement resurfacing system includes a mobile vehicle 102 having a first longitudinal axis 200 (shown in FIG. 5). A material delivery mechanism 104 of the pavement resurfacing system 100 is coupled to mobile vehicle 102 and includes a second longitudinal axis 202 (shown in FIG. 5) centered between a first end 150 and a second end 151 of material delivery mechanism 104. Actuation system 106 is coupled to both mobile vehicle 102 and to material delivery mechanism 104, and, as described herein, is configured to actuate material delivery mechanism 104 with respect to mobile vehicle 102 such that first longitudinal axis 200 of mobile vehicle 102 is oriented obliquely with respect to second longitudinal axis 202 of material delivery mechanism 104.

As best shown in FIGS. 2 and 4, mobile vehicle 102 includes a pair of sleeves 108 that receive a bracket 110 of material delivery mechanism 104 to support material delivery mechanism 104 from mobile vehicle 102. Additionally, in the exemplary embodiment, bracket 110 is coupled to a frame 112 of material delivery mechanism 104 via a flexible linkage, such as, but not limited to, a chain. In operation, sleeves 108 are moveable relative to mobile vehicle 102 to facilitate lifting and lowering material delivery mechanism 104 with respect to a pavement surface 208 (shown in FIG. 5). Alternatively, mobile vehicle 102 supports material delivery mechanism in any manner that facilitates operation of system 100 as described herein.

In the exemplary embodiment, material delivery mechanism 104 includes a primary dispersing element 116 and a secondary dispersing element 118. Frame 112 extends between dispersing elements 116 and 118. Dispersing elements 116 and 118 are configured to disperse the spreadable material mixture exiting a chute 122 on mobile vehicle 102 on pavement surface 208. In the exemplary embodiment, dispersing elements 116 and 118 are either a brush or a blade (e.g., a squeegee) system. Alternatively, dispersing elements 116 and 118 are any other means of evenly dispersing the spreadable material on pavement surface 208. More specifically, primary dispersing element 116 is a strike off element that allows only a desired amount of the spreadable material to pass through. Secondary dispersing element 118 is a texturing element that applies a texture to the spreadable material once it is in place.

Material delivery mechanism 104 also includes a material transfer device 120 positioned between dispersing elements 116 and 118. In the exemplary embodiment, material transfer device 120 is a rotating auger that transfer the spreadable material from the center of material delivery mechanism 104 towards the outer end of material delivery mechanism 104 to facilitate evenly dispersing the spreadable material across material delivery mechanism 104.

In the exemplary embodiment, as best shown in FIG. 2, material delivery mechanism 104 includes a single row of material transfer devices 120 that each push material from a center of material delivery mechanism 104 towards a respective one of first end 150 and second end 151. Once the material is moved towards ends 150 and 151, it discharges from material delivery mechanism 104 at a desired thickness determined by dispersing elements 118. More specifically, dispersing elements 116 and 118 are set at a desired height from the pavement surface to create a desired thickness of material.

In another contemplated embodiment (not shown), material delivery mechanism 104 includes a second set of material transfer devices that push material from ends 150 and 151 back towards the center of material deliver mechanism 104. The second set of material transfer devices circulate the material in a constant flow pattern within material delivery mechanism 104 to prevent the material from setting prematurely.

In yet another contemplated embodiment (not shown), material delivery mechanism 104 does not include material transfer devices 120. No matter the amount of material transfer devices 120, material delivery mechanism 104, in the exemplary embodiment, articulates and uses the height setting of dispersing elements 116 and 118 to force the windrow of material to a desired location.

In the exemplary embodiment, actuation system 106 includes a hydraulic system having a plurality of hydraulic cylinders coupled to mobile vehicle 102 and to material delivery mechanism 104 that actuate material delivery mechanism 104 relative to mobile vehicle 102, as described herein. More specifically, actuation system 106 includes a pair of hydraulic cylinders including a first hydraulic cylinder 124 and a second hydraulic cylinder 126 spaced a distance apart. In one embodiment, hydraulic cylinders 124 and 126 are coupled at one end to mobile vehicle 102 and at the opposing end to material delivery mechanism 104. More specifically, hydraulic cylinders 124 and 126 are coupled to one of frame 112 and primary dispersing element 116 of material delivery mechanism 104. Alternatively, hydraulic cylinders 124 and 126 are coupled to any component of material delivery mechanism 104 to facilitate operation of system 100 as described herein.

As best shown in FIG. 5, actuation system 106 actuates material delivery mechanism 104 such that the first longitudinal axis 200 of mobile vehicle 102 is oriented obliquely with respect to the second longitudinal axis 202 of material delivery mechanism 104. More specifically, when mobile vehicle 102 and material delivery mechanism 104 are in a first position 204, first longitudinal axis 200 is oriented at a first angle relative to second longitudinal axis 202. In the exemplary embodiment, the first position illustrates system 100 traveling down a relative straight roadway such that the first longitudinal axis 200 and the second longitudinal axis 204 are aligned and parallel. In such a configuration the angle between axes 200 and 202 is zero. Although axes 200 and 202 are illustrated as being aligned in FIG. 5, it is contemplated that material delivery mechanism 104 could be offset in a direction perpendicular to the direction of travel such that axes 200 and 202 are not aligned, but remain parallel.

In the exemplary embodiment, when motor vehicle 102 and material delivery mechanism 104 are in a second position 206, second longitudinal axis 202 is oriented at a second angle α relative to first longitudinal axis 200. More specifically, second longitudinal axis 202 is oriented obliquely relative to first longitudinal axis 200 when system 100 is in the second position 206. In the exemplary embodiment, second position 206 illustrates system 100 traveling around the periphery of a circle or curve. For example, a cul-de-sac. As shown in FIG. 5, second angle α is defined by aligning first longitudinal axis 200 with a width centerline of mobile vehicle 102 and by aligning second longitudinal axis 202 with a width centerline of material delivery mechanism 104. In the exemplary embodiment, second angle α is between 0 degrees and 90 degrees. Alternatively, second angle α may be any angle that facilitates operation of system 100 as described herein.

Additionally, as shown in FIG. 5, when system 100 is in the first position 204, first and second hydraulic cylinders are extended to approximately the same length. However, in the second position 206, first hydraulic cylinder 124 is longer than second hydraulic cylinder 126. This difference in hydraulic cylinder lengths is what causes material delivery mechanism 104 to actuate relative to mobile vehicle 102. It is contemplated that when system 100 is traveling in the opposite direction around a curve, then second hydraulic cylinder 126 will be extended to a length longer the first hydraulic cylinder 124.

In operation, the spreadable material falls out of chute 122 and is partially dispersed by primary dispersing element 116. Then, material transfer device 120 transfers the spreadable material from the center of material delivery mechanism 104 to the outer end of material delivery mechanism 104. In the exemplary embodiment, the outer end of material delivery mechanism 104 is aligned with the edge 210 of the road surface 208 to facilitate transferring the spreadable material toward edge 210 using material delivery mechanism 104. Secondary dispersing element 118 is then dragged over the spreadable material to provide shaping and texture. In another embodiment, the material delivery mechanism 104 is actuated to a point where at least a portion of the outer end of the material delivery mechanism 104 extends beyond edge 210. In such a configuration, the outer end of the material delivery mechanism 104 is no longer tangential to the edge 210 of the road surface 208.

This actuated dispersal is particularly important when traveling in an arc where a minimal amount of spreadable material is required closer to the center point of rotation. Conversely, due the larger amount of surface area of surface 208 to be covered proximate edge 210 at the outer end of the material delivery mechanism 104, a higher material delivery rate is required to achieve a uniform material flow. The greater the degree of actuation, that is, the higher the angle α, the higher the material delivery rate required to uniformly cover surface between the opposing lateral ends of material delivery mechanism 104. Uniform material flow laterally within the box as well as uniform flow exiting beneath it is important due to the quick setting nature of some spreadable materials and also because of the tendency for some spreadable materials to segregate. Specifically, when performing a microsurfacing operation, once the materials (oil, rock, water, cement) are combined, a chemical reaction begins. The nature of the microsurfacing material is a quick set material that requires constant movement to prevent curing. As such, areas of stagnation in the delivery mechanism are undesirable. In the exemplary embodiment, primary and secondary dispersing elements 116 and 118 along with material transfer device 120 serve to keep the spreadable microsurfacing material in motion and moving toward its desired location.

The method and systems described herein facilitate re-surfacing a pavement surface. Specifically, the method and systems for re-surfacing as described above facilitate applying a spreadable material as close as possible to an edge of a curved path by actuating the material delivery mechanism relative to the mobile vehicle using hydraulic cylinders.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for re-surfacing a pavement surface, said system comprising:
    a mobile vehicle having a first longitudinal axis;
    a material delivery mechanism having a second longitudinal axis, wherein material delivery mechanism comprises:
        a plurality of dispersing elements; and
        at least one material transfer device configured to transfer paving material toward an outer end of said material delivery mechanism; and
    an actuation system coupled to said mobile vehicle and to said material delivery mechanism, wherein said actuation system is configured to actuate said material delivery mechanism including said material transfer device and said plurality of dispersing elements with respect to said mobile vehicle such that said first longitudinal axis is oriented obliquely with respect to said second longitudinal axis, wherein said material delivery mechanism is spaced from the mobile vehicle in the direction of the first longitudinal axis.

2. The system in accordance with claim 1 wherein said wherein said second longitudinal axis is oriented at a first angle relative to said first longitudinal axis in a first position, wherein said actuation system is configured to actuate said material delivery mechanism to a second position where said second longitudinal axis is oriented at a second angle relative to said first longitudinal axis.

3. The system in accordance with claim 2 wherein said second longitudinal axis is obliquely oriented relative to said first longitudinal axis in the second position.

4. The system in accordance with claim 2 wherein said second angle is between zero degrees and ninety degrees.

5. The system in accordance with claim 1 wherein said first longitudinal axis is aligned with a width centerpoint of said mobile vehicle, and wherein said second longitudinal axis is aligned with a width centerpoint of said material delivery mechanism.

6. The system in accordance with claim 1 wherein said material delivery mechanism comprises a hydraulic system configured to actuate said material delivery mechanism relative to said mobile vehicle.

7. The system in accordance with claim 6 wherein said hydraulic system comprises a plurality of hydraulic cylinders coupled to said mobile vehicle and to said material delivery mechanism.

8. The system in accordance with claim 7 wherein said plurality of hydraulic cylinders comprises a pair of hydraulic cylinders spaced a distance apart.

9. The system in accordance with claim 7 wherein said plurality of hydraulic cylinders are independently actuable.

10. The system in accordance with claim 1 wherein said plurality of dispersing elements comprise a primary dispersing element and a secondary dispersing element.

11. The system in accordance with claim 10 wherein material transfer device is positioned between said primary dispersing element and said secondary dispersing element.

12. The system in accordance with claim 1 wherein said material delivery mechanism comprises at least one bracket and said mobile vehicle comprises at least one sleeve configured to receive said at least one bracket to facilitate coupling said material delivery mechanism to said mobile vehicle.

13. The system in accordance with claim 1 wherein said at least one sleeve is movable relative to said mobile vehicle to facilitate lifting and lowering said material delivery mechanism.

14. The system in accordance with claim 12 wherein said material delivery mechanism comprises a frame, and wherein said frame is supported from said at least one bracket by a flexible linkage.

15. A method for re-surfacing a pavement surface using a pavement resurfacing system, said method comprising:
  coupling a material delivery mechanism to a mobile vehicle, wherein the mobile vehicle includes a first longitudinal axis and the material delivery mechanism includes a second longitudinal axis;
  coupling an actuation system between the mobile vehicle and to the material delivery mechanism such that the material delivery mechanism is spaced from the mobile vehicle in the direction of the first longitudinal axis, wherein the material delivery mechanism includes a plurality of dispersing elements and at least one material transfer device;
  operating the actuation system to move the material delivery mechanism including the material transfer device and the plurality of dispersing elements with respect to the mobile vehicle such that the first longitudinal axis is oriented obliquely with respect to the second longitudinal axis.

16. The method in accordance with claim 15 wherein operating the actuation system comprises operating the actuation system to move the material delivery mechanism from a first position where the second longitudinal axis is oriented at a first angle relative to the first longitudinal angle to a second position where the second longitudinal axis is oriented at a second angle relative to the first longitudinal angle.

17. The method in accordance with claim 16 wherein operating the actuation system comprises operating the actuation system such that the second longitudinal axis is obliquely oriented relative to the first longitudinal axis in the second position.

18. The method in accordance with claim 16 wherein operating the actuation system comprises operating the actuation system such that the second angle is between zero degrees and ninety degrees.

19. The method in accordance with claim 15 wherein coupling an actuation system comprises coupling a hydraulic system to the mobile vehicle and to the material delivery mechanism.

20. The method in accordance with claim 19 wherein coupling a hydraulic system comprises coupling a plurality of hydraulic cylinders to the mobile vehicle and to the material delivery mechanism.

21. The method in accordance with claim 20 wherein coupling a plurality of hydraulic cylinders comprises coupling a pair of hydraulic cylinders spaced a distance apart to the mobile vehicle and to the material delivery mechanism.

22. The method in accordance with claim 21 wherein operating the actuation system comprises independently activating at least one of the pair of hydraulic cylinders to move the material delivery mechanism relative to the mobile vehicle such that the first longitudinal axis is oriented obliquely with respect to the second longitudinal axis.

23. The method in accordance with claim 15 wherein operating the actuation system comprises activating at least one hydraulic cylinder to move the material delivery mechanism relative to the mobile vehicle such that the first longitudinal axis is oriented obliquely with respect to the second longitudinal axis.

24. The method in accordance with claim 15 further comprising:
  dispersing spreadable material with a primary dispersing element of the material plurality of dispersing elements;
  transferring the spreadable material toward an outer end of the material delivery mechanism with the material transfer device; and
  dispersing the spreadable material with a secondary dispersing element of the plurality of dispersing elements.

25. The method in accordance with claim 24 wherein the transferring step is performed after dispersing with the primary dispersing element, and wherein the transferring step is performed before dispersing with the secondary dispersing element.

26. A method for re-surfacing a pavement surface using a pavement resurfacing system, said method comprising:
  driving a mobile vehicle, having a material delivery mechanism coupled thereto, across the pavement surface, wherein the mobile vehicle includes a first longitudinal axis and the material delivery mechanism includes a second longitudinal axis, and wherein the material delivery mechanism is spaced from the mobile vehicle in the direction of the first longitudinal axis;
  actuating, with an actuation system, the material delivery mechanism with respect to the mobile vehicle from a first position where the second longitudinal axis is oriented at a first angle relative to the first longitudinal axis to a second position where the second longitudinal axis is oriented at a second angle relative to the first longitudinal angle, wherein as the angle defined between the first longitudinal axis and the second longitudinal axis increases, the material delivery rate to the pavement surface also increases.

27. The method in accordance with claim 26 wherein actuating the material delivery mechanism comprises actuating the material delivery mechanism such that the second longitudinal axis is obliquely oriented relative to the first longitudinal axis in the second position.

28. The method in accordance with claim 26 wherein actuating the material delivery mechanism comprises actuating the material delivery mechanism such that the second angle is between zero degrees and ninety degrees.

29. The method in accordance with claim 26 wherein actuating the material delivery mechanism comprises actuating a hydraulic system coupled between the mobile vehicle and to the material delivery mechanism.

30. The method in accordance with claim 29 wherein actuating the hydraulic system comprises actuating a pair of hydraulic cylinders spaced a distance apart and coupled between the mobile vehicle and to the material delivery mechanism.

31. The method in accordance with claim 30 wherein actuating the pair of hydraulic cylinders comprises independently activating at least one of the pair of hydraulic cylinders to move the material delivery mechanism relative to the mobile vehicle such that the first longitudinal axis is oriented obliquely with respect to the second longitudinal axis.

32. The method in accordance with claim 26 further comprising:
dispersing spreadable material with a primary dispersing element of the material delivery mechanism;
transferring the spreadable material toward an outer end of the material delivery mechanism with a material transfer device of the material delivery mechanism; and
dispersing the spreadable material with a secondary dispersing element of the material delivery mechanism.

33. The method in accordance with claim 32 wherein the transferring step is performed after dispersing with the primary dispersing element, and wherein the transferring step is performed before dispersing with the secondary dispersing element.

* * * * *